United States Patent [19]

Hunter

[11] 4,416,065
[45] Nov. 22, 1983

[54] METHOD OF AND APPARATUS FOR ALIGNING VEHICLE FRONT AND REAR WHEELS

[76] Inventor: Lee Hunter, 13501 Ladue Rd., Creve Coeur, Mo. 63141

[21] Appl. No.: 343,825

[22] Filed: Jan. 29, 1982

[51] Int. Cl.³ .............................................. G01B 7/315
[52] U.S. Cl. ........................... 33/203.15; 33/180 AT; 33/203.18; 33/288; 356/152; 356/155
[58] Field of Search ................. 33/288, 336, 337, 335, 33/180 AT, 181 AT, 203, 203.12, 203.15, 203.16, 203.18, 203.19; 356/155, 152, 156

[56] References Cited

U.S. PATENT DOCUMENTS

| 2,601,262 | 6/1952 | Carrigan | 356/155 |
| 3,091,862 | 6/1963 | MacMillan | 33/46 |
| 3,206,862 | 9/1965 | Hunter | 33/203.18 |
| 3,552,024 | 1/1971 | Hunter | 33/203.12 |
| 4,095,902 | 6/1978 | Florer et al. | 356/155 |
| 4,097,157 | 6/1978 | Lill | 356/152 |
| 4,265,537 | 5/1981 | Hunter | 356/155 |
| 4,274,738 | 6/1981 | Hollandsworth et al. | 356/155 |

FOREIGN PATENT DOCUMENTS 955610  4/1964  United Kingdom ................. 33/288

*Primary Examiner*—Willis Little
*Attorney, Agent, or Firm*—Gravely, Lieder & Woodruff

[57] ABSTRACT

Apparatus for aligning vehicle front and rear wheels and a method of applying such apparatus in which projectors of light beams on the front wheels direct beams forwardly to a cooperating alignment stand and direct beams rearwardly to cooperate with devices on the rear wheels which include scales and reflective surfaces used in aligning the front wheels and determining the positions of the rear wheels relative to the vehicle longitudinal axis or geometric center line. The projectors on the front wheels support screens in positions to cooperate with the light beams when reflected back from the stand and from the rear wheels.

13 Claims, 9 Drawing Figures

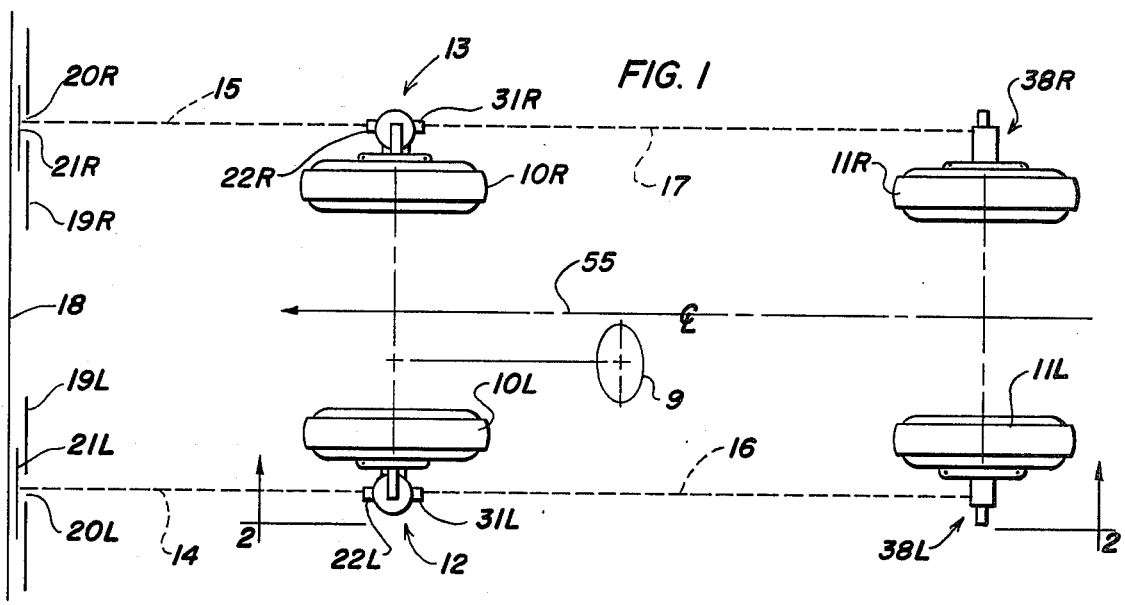
FIG. 1
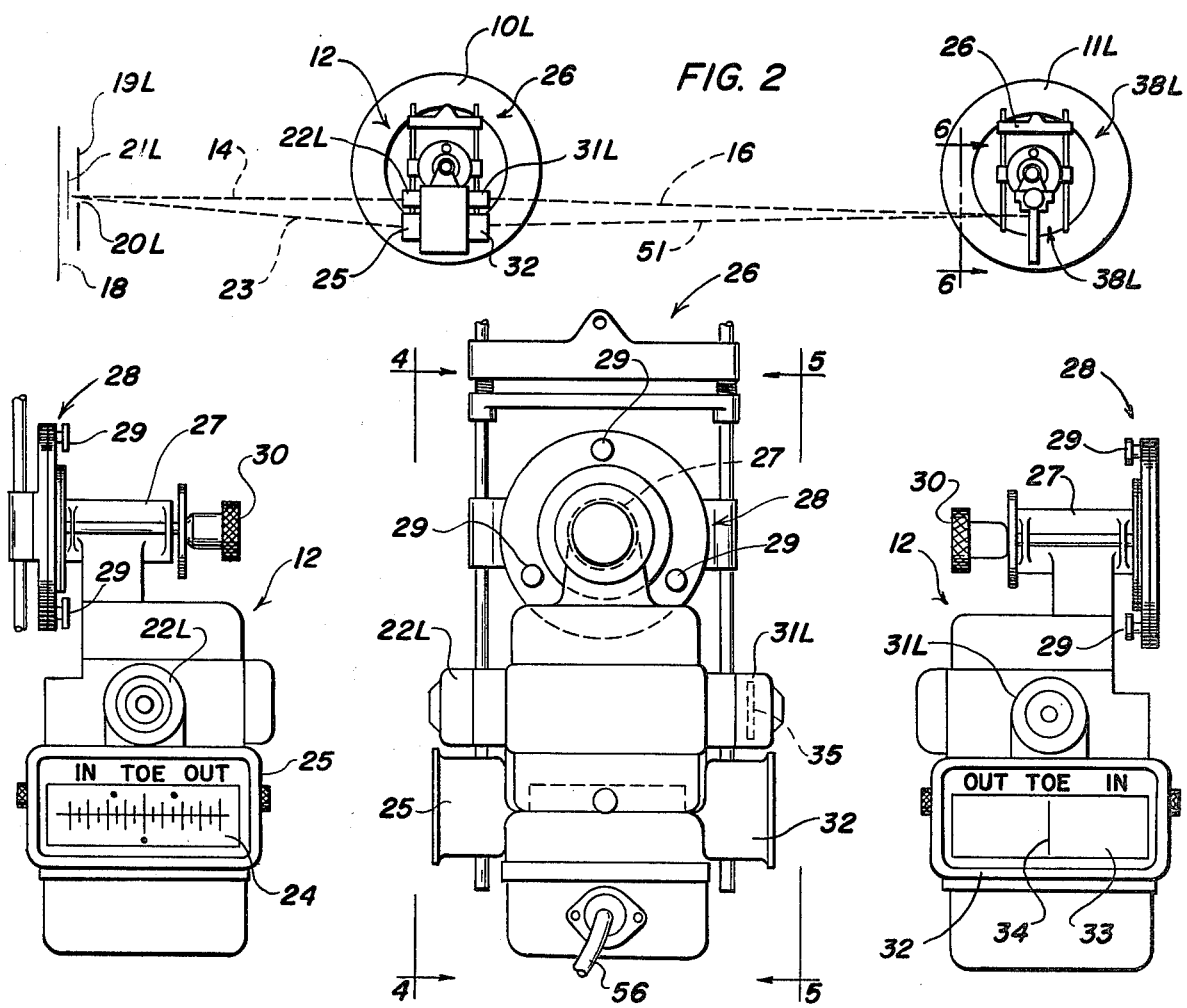
FIG. 2
FIG. 4  FIG. 3  FIG. 5

METHOD OF AND APPARATUS FOR ALIGNING VEHICLE FRONT AND REAR WHEELS

BACKGROUND OF THE INVENTION

1. Field of the Invention

This invention pertains to a method of aligning the front and rear wheels of a vehicle in relation to the geometic center line of the vehicle, and to apparatus for practicing the method.

2. Description of the Prior Art

The apparatus which is present in the prior art and related to the method as well as apparatus for aligning front and rear wheels of a vehicle is exemplified in Carrigan U.S. Pat. No. 2,601,262 of June 24, 1952. In this patent light beam projectors are disposed near the front or steerable wheels, mirrors are carried on the rear of nonsteerable wheels, and screens are disposed at some distance from the front wheels so that charts may be projected directly upon the screens from the front and rear wheels. This apparatus to enable the aligning of vehicle wheels is expensive and quite complicated and in use calls for the bodily shifting of the vehicle to bring the vehicle axis into parallelism with the light beams projected rearwardly from the projectors positioned near the front wheels.

There are other more recent prior art examples utilizing mirrors mounted on the rear wheels of a vehicle, such examples being exemplified by Florer et al U.S. Pat. No. 4,095,902 of June 20, 1978, Lill U.S. Pat. No. 4,097,157 of June 27, 1978 and Hunter U.S. Pat. No. 4,265,537 of May 5, 1981.

Among the prior art of lesser pertinence, attention can be directed to MacMillan U.S. Pat. No. 3,091,862 of June 4, 1963 and Hunter U.S. Pat. No. 3,206,862 of Sept. 21, 1965.

The problems encountered in the prior art apparatus include such things as inability to align all four wheels of a vehicle to its geometric center line, failure to provide means which can accommodate vehicles having different wheel base dimensions, and failure to coordinate the relationship of the front and rear wheels with the geometric center line and with center point steering. It is recognized that the prior art apparatus tends to provide expensive instruments which complicate the job of determining wheel alignment conditions.

SUMMARY OF THE INVENTION

A preferred embodiment of this invention is exemplified in apparatus comprising light beam projectors mounted on the front wheels of the vehicle, mirror and scale targets mounted on the rear wheels, screens carried by the projectors in rearwardly facing positions, reticles in the rearwardly aimed beam projectors so scales are reflected off the mirrors and return to the screens carried by the projected light beam, and means to focus the reticle scales at the front mirrors so the apparatus will be independent of vehicle wheel base differences.

The present invention provides an organization of relatively inexpensive apparatus which can perform vehicle wheel alignment operations with accuracy and with only modest experience. For example a vehicle is positioned in an alignment testing position in front of an alignment stand having front wheel toe and other alignment information thereon. After turning the steering wheel so it is substantially centered for straight ahead travel, the front wheel instruments, in conjunction with the alignment stand mirrors, are examined for desired toe-in by adjusting the tie-rod ends. With the front wheel projector light beams casting a zero index onto scales at the rear wheels, it is necessary to turn the front wheels until the scale readings at the rear wheels are the same (the average of the separate readings at each rear wheel). This places the front wheels in substantially true straight ahead positions.

A subsequent operation includes adjusting the front wheel tie-rod ends so the wheels can be moved into zero-toe positions, and so they are substantially parallel with the geometric axis or center line of the vehicle. Next the zero indicies projected from the front wheel instruments onto the rear wheel scales need to be brought to the same scale values by turning the front wheels as required. This last procedure is followed by adjusting the focus of the front wheel rearwardly directed light projectors so reticle scales with the before mentioned zero indicies can be clearly seen on screens carried by the front wheel projectors. This accommodates various vehicle wheel bases. The front screens have an index line which is used with the projected zero indicies to determine the extent of rear wheel toe-in (or toe-out if any). If the scale readings are different, that indicates the rear wheels need adjustment to bring the scale readings into close equality. This last procedure will result in placing the rear wheel thrust line in desired alignment relative to the geometric axis or vehicle center line so the vehicle can move in a line closely parallel to the center line direction.

An alternate subsequent operation, which may be performed after placing the front wheels in a straight ahead position, is to avoid the second step of adjusting the front wheels to zero-toe and go directly to the investigation of the rear wheel alignment. This procedure, as explained above, requires focusing the reticle vertical light line and horizontal scale on the screen at the front wheels so the rear wheel toe positions can be observed. These readings then must be corrected by the amount of the front wheel toe readings. In making the correction, the calculation should be such that it will result in obtaining the rear wheel toe-in value as if the front wheels had been adjusted to zero-toe.

The objects of the invention are to simplify the apparatus as to cost and operation, to arrive at wheel alignment information with a minimum of need to manipulate the apparatus, to determine the alignment of front and rear wheels relative to the geometric center line of the vehicle, and to provide easily used apparatus for aligning the front and rear wheels in relation to center point steering.

Other objects of the invention include the provision of low cost alignment apparatus so vehicle alignment equipment may reach a wider field of vehicle inspection stations, and the provision of apparatus having an easily mastered method of application to four wheel vehicles differing in wheel base dimensions.

Still other objects of the invention will appear in the following specification related to the form of apparatus illustrated in the drawings.

BRIEF DESCRIPTION OF THE DRAWINGS

FIG. 1 is a schematic plan view of the vehicle wheels and wheel mounted instruments in relation to a stand with alignment charts and mirrors;

FIG. 2 is a side elevational diagram showing the cooperating instruments on the wheels at the left side of a vehicle (such instruments being typical for those used at the right side) for checking rear wheel alignment, the view being taken along line 2—2 in FIG. 1;

FIG. 3 is an enlarged view of a typical beam projecting instrument for the front wheel;

FIG. 4 is a view of the instrument of FIG. 3 as seen along line 4—4;

FIG. 5 is a view of the instrument of FIG. 3 as seen along line 5—5;

DESCRIPTION OF THE PREFERRED EMBODIMENTS

Figure 6:
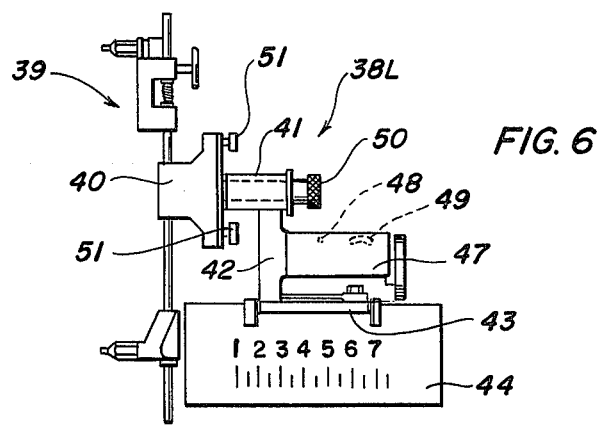
FIG. 6 is an enlarged view of a typical mirror and scale instrument for the rear wheels of a vehicle, the view being taken along line 6—6 in FIG. 2 with an alignment scale in operative position.

In FIG. 1 there is shown in a schematic plan view the front and rear pairs of vehicle wheels at 10L, 10R, 11L and 11R. The front and rear pairs of wheels are longitudinally spaced to represent the vehicle wheel base which may be typical for the current small cars or for the large luxury type cars, although commercial and heavy duty vehicles are not excluded. The front wheels carry light projector units 12 and 13 respectively which throw light beams forwardly along the beam axes 14 and 15, and other light beams rearwardly along beam axes 16 and 17. In a suitably spaced position is a front stand represented by the line 18, and that stand supports left and right alignment charts 19L and 19R. The charts have respective windows 20L and 20R, and behind the windows are the respective mirrors 21L and 21R.

The foregoing parts are provided for the purpose of illustrating a conventional organization of equipment parts whereby the front wheels 10L and 10R may be aligned for toe-in, without regard to any other wheel set. In the present invention, after the steering wheel 9 has been placed in a centered steering position, it is required that the front wheels are to be adjusted into a desired toe-in position by projecting the light beams 14 and 15 onto the respective mirrors 21L and 21R from the respective light beam projecting bodies 22L and 22R. As shown in FIG. 2, the beam 14 reflected from mirror 21L returns along beam axis 23, and the same reflection, though not shown, occurs for the beam 15 at the right side projector unit 13. The toe position for the left front wheel 10L is observed by watching the reflected beam 23 of FIG. 2 as it strikes a toe scale 24 positioned in a box 25 on the projector unit 12 seen in FIGS. 3 and 4. A similar observation is made for the right front wheel toe position. By adjusting the usual tie-rod ends (not shown) the beam reflection 23 can be brought to a position coincident with the desired toe-in reading at scale 24. Of course, the right front wheel 10R is adjusted for desired toe by observing the reflection of light beam 15 off mirror 21R as it strikes a toe-in and toe-out scale similar to scale 24, but in a box (not shown) carried by the projector unit 13. In this manner, the front wheels can be adjusted to the desired toe-in alignment with respect to each other, and this is done while the steering wheel 9 is in a substantially straight ahead position, or close to a center point position.

The views of FIGS. 2, 3 and 4 show the light projector unit 12 (and the same feature is applicable to the right front wheel unit 13) mounted on a wheel adaptor 26 providing a pivot bearing hub 27 carried on a shaft (not shown) projecting from a compensating plate assembly 28. The assembly carries three adjusting knobs 29 which are spaced at 120° so that the run-out of the wheel 10L can be compensated, whereby the wheel rotation will not cause the light beams to develop a sinusoidal motion. The projector 12 is allowed free pendulus movement while the compensation adjustment is being carried out, after which it can be secured by turning in on knob 30.

Figure 5A:
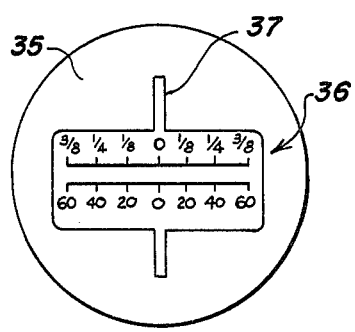
FIG. 5A is a view of a reticle used in the beam projector instrument shown in FIG. 3, and a similar reticle is in the instrument at the right front wheel.

It is observed in FIGS. 1, 2, and 3 that the projector unit 12 on the left front wheel 10L has a barrel for light beam projector 31L directed rearwardly to throw a beam 16 toward the companion rear wheel 11L. What will be described hereinafter will also apply to the right side projector 13 and its rearwardly directed light beam 17, except that parts that are suitable for only the left side will need to be reversed for use at the right side, all as is well understood in the art. It is also shown in FIG. 3 that there is a second box 32 just beneath the barrel for projector 31L, and in FIG. 5 the box 32 carries a screen 33 provided with a zero-index-toe line 34 dividing the toe-in and toe-out directions for the left rear wheel 11L. Of particular importance in FIGS. 3 and 5A is the presence of a reticle plate 35 mounted in the barrel of beam projector 31L so that a special beam pattern is generated. That pattern comprises a horizontal scale 36 presenting wheel toe indicia image in fractions of inches or in minutes of angles. The pattern also comprises zero image or vertical index line 37 which represents the zero position for both of the indicia representing the horizontal scale 36. The light beams, therefore, projects that combined image of scale and zero index toward the left rear wheel, and a similar but reversed beam image makes up the right hand rear beam 17 of FIG. 1.

Figure 7:
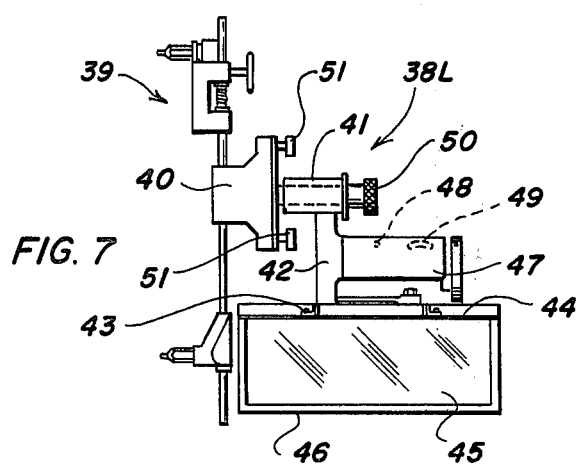
FIG. 7 is a view similar to FIG. 6 but with a mirror in operative position and the scale pivoted out of the way.

The present apparatus also comprises an assembly 38L mounted on the left rear wheel 11L, as seen in FIGS. 6 and 7. The assembly 38L includes an adaptor 39 similar to the adaptor 26 of FIG. 3 for mounting the assembly on the wheel rim in known manner. A slide body 40 is movable vertically so as to place the pivot body 41 generally opposite the axis of wheel rotation. The body 41 carries a bracket 42 which supports hinge means 42 for a target plate 44 on which is applied a scale made up of numerals from 1 to 7. When the target plate 44 is hinged upwardly it uncovers a reflective target or mirror 45 carried in a suitable frame 46 which may be part of the bracket 41. Also part of bracket 42 is a support 47 for a pair of spirit levels seen in dotted outline at 48 and 49. The levels are used to position the bracket 42 in a substantially vertical position after which the bracket 42 can be secured by tightening up on the knob 50. As will appear it may be necessary to adjust the reflective target 45 so it will redirect the light beam 16 projected from barrel 31L onto the screen 33 in box 32 at the front wheel, the path of the reflected beam being seen at 51 in FIG. 2. An assembly 38R, similar to the assembly 38L described above, is mounted on the right rear wheel 11R, and presents target scale means and target reflective means.

It is necessary to compensate the assemblies 38L and 38R for wheel run-out, this compensation is accomplished during wheel rotation through the use of adjusting threaded elements 51 which function as do the elements 28 in the assembly seen in FIG. 3. The compensation places the targets in positions substantially perpendicular to the plane of wheel rotation for the respective wheels 11L and 11R.

Figure 8:
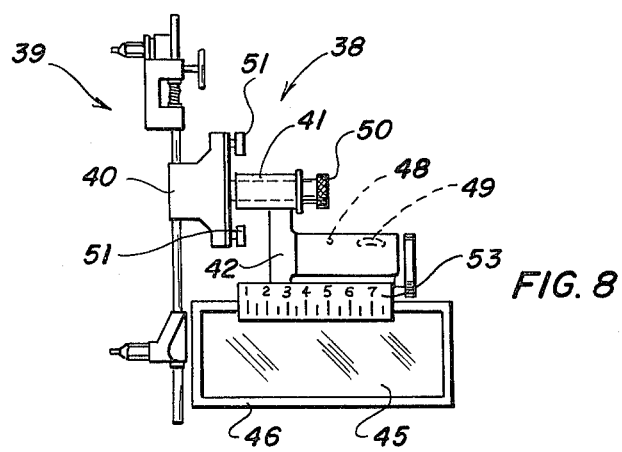
FIG. 8 is a view of the instrument of FIG. 6 as modified to have a scale and a mirror in operative positions.

A modified assembly 52 is seen in FIG. 8 to be essentially like the assembly 38L described and seen in FIGS. 6 and 7. The difference resides in the provision of a fixed target plate 53 placed along the margin of the reflective target 48 in frame 46. The several parts of the modified assembly 52 which are like those parts seen in FIGS. 6 and 7 are designated by like reference numerals.

The apparatus thus described in connection with the several views in the drawings is useful for aligning the front and rear vehicle wheels relative to the geometric center line 55 as shown in FIG. 1. When in use, and with the instruments 12 and 13 suitably mounted on the front wheels 10L and 10R and the assemblies 38L and 38R suitably mounted on the rear wheels 11L and 11R, the electrical supply from lead in 56 (see FIG. 3) is plugged into a current source so the light beam projectors 22L, 22R and 31L and 31R are activated. The compensation procedure is followed so the beams 14 and 15 projected forwardly represent the planes of front wheel rotation, and the rearwardly projected beams 16 and 17 likewise represent the same planes. It is also necessary to carry out the compensation procedure at the rear wheel assemblies 38L and 38R.

In use, the tie-rod ends (not necessary to show) for the front wheel steering system are adjusted so the wheels 10L and 10R can be brought into desired toe-in positions. During this step the light beams 14 and 15 are reflected back from the mirrors 21L and 21R in the front stand 18 to strike on the toe scales, such as the scale 24 in box 25 (FIG. 4) for the left front projector instrument 12, and a similar scale not seen in projector instrument 13. When these reflected beams line up at the toe-in indicia of the scales 24, the toe adjustment is achieved as between the respective front wheels insofar as the planes of rotation are related.

In order to align the front wheels 10L and 10R in a straight ahead position, it is necessary to refer to the rearwardly projected light beams 16 and 17 and note where they strike the target scales 44, or 53 if the assembly of FIG. 8 is used and it is the preferred assembly. At this step, the reticles 35 are focused so they project the zero index or light lines 37 onto the target scales. If these vertical lines 37 strike different scale numbers it is known that the front wheels are not in a straight ahead position, and must be turned until an average of the scale numbers is achieved. That is to say the vertical light lines 37 must be on the target scales 44 or 53 at the same distance out from the rear wheels 11L and 11R for the front wheels 10L and 10R to be straight ahead.

Once the foregoing procedure is completed for positioning the front wheels substantially parallel with the center line 55, the next procedure is to determine what the rear wheel alignment is with respect to the center line 55. This step is accomplished by focusing the light beams 16 and 17 while using the reflective target 45 in the assembly 38 or 52 and observe where the scale 36 and index 37 of the reticle 35 strikes the screen 33 in relation to the index 34. At this time, the horizontal scale 36 is thrown on the screen 33 and the zero index 37 is also thrown on screen 33. In the majority of vehicles there is some toe present in the rear wheels, and in that case the zero index 37 will either fall to one side or the other of the index 34 in the screen 33. In FIG. 5 it can be understood that if the index line 37 is to the right of the index 34 the left rear wheel 11L has toe-in alignment. A similar observation is required at the right side of the vehicle to note whether the indicies 37 and 34 show zero-toe or either toe-in or toe-out for wheel 11R. Once the observation is made at each screen 33 in instruments 12 and 13, it is necessary to adjust the respective rear wheels so the observed toe condition for each rear wheel is the same. It is normally desired to have toe-in for each rear wheel of a predetermined amount. To obtain a true reading it is necessary to correct the rear toe readings by adding or subtracting the front wheel toe readings.

Some vehicles do not permit rear wheel alignment adjustments, and in that event the observed and corrected readings obtained by reflecting the reticle image back to the front wheel instruments will permit adjusting the front wheel alignment to compensate for rear wheel thrust line alignment and still obtain straight ahead running of the vehicle even though the center line 55 may not be closely parallel to the straight ahead direction of travel.

While the foregoing alignment procedure or steps in aligning the front and rear wheels of a vehicle in relation to the vehicle geometric center line or axis is preferred, there is an alternate procedure, as follows: The vehicle is again placed in a position with its geometric or longitudinal axis generally perpendicular to the stand at one end of the alignment shop, such stand being represented at 18. Projector units 12 and 13 are mounted on the front wheels 10L and 10R and are compensated by elements 29 (FIG. 3) for wheel run-out. The charts 19L and 19R and the associated mirrors 21L and 21R can be moved so the windows 20L and 20R are properly positioned to allow the projected light beams 14 and 15 to line up with the mirrors so the vertical light line reflected by the mirrors will appear on the toe scales 24 (See FIG. 4).

The instrument assemblies 38L and 38R are mounted on the rear wheels 11L and 11R and are compensated for wheel run-out by the elements 51 (see FIG. 6 of FIG. 8 for assembly 52). In the initial use of the assemblies 38L and 38R, the target plates 44 need to be moved down over the reflective surface 45 so the scale is in view. When the assembly of FIG. 8 is used, it presents the target scale 53 as well as the reflective surface 45 in position for use.

Having mounted the instruments and assemblies on the respective wheels, the alignment procedure involves first adjusting the toe of the front wheels 10L and 10R into predetermined desired toe-in by observing the movement of the vertical light line reflected off mirrors 21L and 21R relative to the fixed scales 24 in the boxes 25 at the forward side of the projector units 12 and 13. This operation is accomplished by manipulating the tie-rod ends of the steering linkage under the vehicle. As mentioned before this operation is done with the steering wheel 9 centered. The cooperation between the front wheel instrument units 12 and 13, and the rear wheel assemblies 38L and 38R is now required to place the alignment of the front wheels in a straight ahead position relative to the rear wheels. What will now be described for the left front and rear wheels will apply equally to the right front and rear wheels, thereby shortening the present description.

The light projector in unit 12 of FIG. 2 has its beam 16 directed rearwardly so the zero index or line 37 appears on the target scale, either 44 in FIG. 6 or 53 in FIG. 8. The same result is obtained by light beam 17 at the right side. If the scale reading at the left and right target scales are unequal, as may be the usual case, the front wheels 10L and 10R need to be steered into position where the target scale readings are the same or substantially the same. This maneuver will get the front wheels into position where the planes of rotation are substantially positioned for straight ahead travel.

To find the alignment condition for the planes of rotation of the rear wheels 11L and 11R, the first step is to adjust the tie-rod ends at the front wheels to place these wheels in zero-toe positions by using the front projectors and mirrors in the stand 18. This step differs from the foregoing procedure and may be easier to understand. The next step is to make use of the reflective surface 45 of the assemblies 38L and 38R, or the modified assemblies of FIG. 8, and observe the position of the reticle formed image which is returned to the screen 33 in the rearwardly facing box 32 of the projector at the front wheels. The image so reflected can be directed onto screen 33 by angularly adjusting the reflective surface 45 upon loosening knob 50 and tightening it up when the image is seen at the screen 33. If the reticle image of the light line 38 on screen 33 is not coincident with the index 34 (FIG. 5) there is some rear wheel toe depending on whether it is in toward the vehicle or away from the vehicle, as noted on the screen. The amount of toe alignment will be found on reading the value on the horizontal scale 36 between the vertical light line 37 and the index line 34 of the screen 33.

The actual alignment of the rear wheels being found by the foregoing alternate procedure, it may be observed to what extent adjustment may be needed to align the rear wheels into position of substantially equal toe positions relative to the center line 55 so the vehicle will tend to run in a straight line substantially parallel with the center line 55. If there is no provision to adjust the position of the rear wheels relative to the vehicle body, then the observed toe alignment of the rear wheels, whether substantially equal for toe-in or toe-out, or different, can be used to calculate the needed alignment for the front wheels to keep the vehicle on a straight ahead line of travel. Having this important alignment information, the tie-rod ends in the steering linkage can be appropriately adjusted to accommodate the thrust line drive generated by the rear wheels.

In the preferred embodiment of the present invention the arrangement of the rearwardly directed light beams, which project the form of the beam dictated by the reticle and the reflective surface at the rear wheels to return the beam to the screen at the front wheels, makes the function of the system independent of the vehicle wheel base because the size of the scale and vertical line formed by the reticle is proportional to the distance (wheel base) between the unit 12 at the front wheel and the assembly 38L at the rear wheel. The projector in barrel 31L needs to have a focus adjustment for obtaining a sharp image, but such a feature is well known. Further, the assembly 38L or 38R is arranged to have the scale and reflective surfaces, either one on top of the other, as in FIGS. 6 and 7, or so close together, as in FIG. 8, that a single light beam formed with the combined horizontal scale 36 and vertical light line 37 can be provided, thereby avoiding the split beam required by the earlier apparatus disclosed in 2,601,262.

Referring again to the method where the front wheels are aligned to the desired toe-in and remain in that alignment position for the remainder of the procedure, it was pointed out that upon noting the toe alignment for the rear wheels on the screens 33 a correction had to be made taking into account the toe-in values for the front wheels. The correction required may be expressed in the formula $RT = FT + R$; where RT is the rear toe value, FT is the front toe value, and R is the reticle scale reading. For example, if the front wheel toe-in value is 4° the light beam projected to the reflective surface at the rear wheel will approach at an angle of 4° and will be reflected back toward the screen 33 at a similar angle of 4°. The light beam, carrying the horizontal scale 36 of the reticle and zero index 37 will appear on the screen 33 to correspond to the toe alignment of the rear wheel. If the zero index 37 appears moved 4° from the zero index 34 on the screen 33, it will be on the toe-out or negative side of the index 34 and by the above indicated formula the rear toe can be calculated to be zero. A number of examples can be given to illustrate the utility of the correcting formula; for example, if the front wheel has zero-toe and the rear wheel is found to have zero-toe because the reticle scale in the light beam brings the zero index 37 to the zero index 34 that will indicate zero-toe for the rear wheel. The use of the formula can be best understood by realizing toe value is one that can be calculated by utilizing the scale on the front screen 33 and the mirror in the front stand 18, while the value of "R" is obtained from the relationship of the reticle scale 36 and its zero index 37 on the screen 33 in relation to the zero index 34 thereon.

The foregoing specification has set forth the presently preferred embodiments of structure and has described its method of utility in the field of vehicle wheel alignment art. The teachings of this disclosure may suggest variations which are substantial equivalents of a character which comes within the scope of the disclosure.

What is claimed is:

1. In apparatus for aligning the front and rear wheels of a vehicle relative to the geometric center line of the vehicle, the combination of:
   means carried by the front wheels of the vehicle for projecting light beams forwardly and for projecting other light beams rearwardly toward the rear wheels;
   reticles in said other light beam projecting means forming a pattern which includes horizontally positioned scales and images representing zero positions on the horizontal scales;
   means carried by the rear wheels of the vehicle in position presenting targets for the reticle formed patterns projected rearwardly by said other light beam projectors, said targets including horizontal scales for cooperation with said vertically positioned index lines of said reticles and reflective surfaces for cooperation with said horizontally positioned scales of said reticles to reflect the horizontal scales toward the front wheels; and
   target screens carried by said front wheels in rearwardly facing positions for receiving the horizontally positioned scales as reflected from said reflective surfaces carried by said rear wheels, said target screens presenting vertically oriented index lines for cooperation with said reflected horizontally positioned reticle scales and vertically positioned index lines.

2. The combination set forth in claim 1 wherein said light beam projecting means carried by the front wheels are adjusted to the planes of front wheel to compensate for front wheel rotation run-out; and said means carried by the rear wheels are adjusted such that said target means are substantially perpendicular to the planes of rear wheel rotation.

3. The combination set forth in claim 1 wherein said images of horizontal scales and zero indices are projected simultaneously by said reticle means.

4. The combination set forth in claim 1 wherein said horizontal scales and reflective surfaces on said target means at the rear wheels are simultaneously exposed to the reticle formed patterns from said light beam projecting means carried by the front wheels.

5. The combination set forth in claim 1 wherein said horizontal scales and reflective surfaces on said target means at the rear wheels are alternatively exposed to the reticle formed patterns from said light beams projecting means carried by the front wheels.

6. In apparatus for measuring the alignment characteristics of the front and rear wheels of a vehicle, the combination of:
 means carried by the front wheels of the vehicle for projecting light beams forwardly of the vehicle and for projecting other light beams rearwardly toward the rear wheels;
 means cooperating with said forwardly projected light beams for measuring certain alignment characteristics of the front wheels;
 means carried by the rear wheels of the vehicle in positions to cooperate with said rearwardly projected light beams, said last means including target scales and light beam reflective surfaces;
 reticle means for said rearwardly projected light beams to impose on said light beam images of horizontal scales, said horizontal scales having zero indicia cooperating with said target scales; and
 target screens on said front wheel projectors facing toward said rear wheels and formed with zero index lines in position to cooperate with said zero indicia and horizontal scales reflected by said reflective surfaces forwardly toward said target screens.

7. The combination set forth in claim 6 wherein said light beam projecting means carried by the front wheels are adjusted to the planes of front wheel to compensate for front wheel rotation run-out; and said means carried by the rear wheels are adjusted such that said target means are substantially perpendicular to the planes of rear wheel rotation.

8. The combination set forth in claim 6 wherein said patterns of horizontal scales and zero indicia are projected simultaneously by said reticle means.

9. A method for determining the alignment characteristics of the front and rear wheels of a vehicle in relation to the geometric center line for the vehicle, the method including the steps of:
 initially positioning the front wheels of the vehicle for substantially straight ahead steering;
 positioning target scales and reflection surfaces on the rear wheels in positions substantially perpendicularly to the plane of the rotation of the rear wheels;
 projecting light beams from the front wheels toward the rear wheel target scales and forming the projected light beams into zero indicia and horizontal alignment scales;
 observing the positions of the zero indicia on the respective target scales on the rear wheels;
 repositioning the front wheels from the initial positions such that the observed positions of the zero indicia on the respective target scales on the rear wheels are aligned to substantially the same positions on the respective target scales;
 reflecting the horizontal alignment scales from the rear wheel reflection surfaces back toward the front wheels;
 providing target screens with zero index lines at the front wheels in positions facing the rear wheels; and
 observing at the front wheels the alignment positions of the rear wheels indicated by the zero indicia and horizontal alignment scales reflected from the rear wheels aligning on the target screen zero index lines located adjacent the light beams projected from the front wheels.

10. The method set forth in claim 9 and including the steps of:
 adjusting the alignment of the front wheels for predetermined toe-in;
 utilizing the target scales at the rear wheels for positioning the front wheels in straight ahead positions; and
 correcting the observed positions of the horizontal alignment scales relative to the zero index lines adjacent the front wheels by the amounts of the predetermined toe-in for the front wheels.

11. The method set forth in claim 9 and including the steps of:
 adjusting the alignment of the front wheels into substantially zero-toe positions;
 observing the rear wheel alignment response displayed at the front wheel light projecting means; and
 adjusting the rear wheel alignment relative to the vehicle geometric center line to predetermine toe positions.

12. A method for determining and displaying the alignment positions of the rear wheels of a vehicle in relationship to the known positions of alignment of the front wheel of the vehicle comprising the steps of:
 locating the front wheels into known positions of alignment;
 providing light beam interchanging means between the front and rear wheels for indicating the alignment positions of the front and rear wheels;
 utilizing rear wheel position indicating means to adjust the front wheel positions such that the planes of rotation are located for straight ahead steering relative to the geometric center line of the vehicle;
 adjusting the planes of rotation of the rear wheels, relative to the adjusted positions of the front wheels, into positions of predetermined alignment relative to the geometric center line of the vehicle; and
 displaying at the front wheels the alignment of the planes of rotation of the rear wheels during adjustment of the positions of the rear wheels.

13. The method set forth in claim 12 and including the steps of:
 adjusting the front wheels into positions of predetermined toe-in; and
 utilizing the predetermined front wheel toe-in values to correct the amount of the adjustment of the rear wheels into the predetermined alignment positions.

* * * * *

UNITED STATES PATENT AND TRADEMARK OFFICE
CERTIFICATE OF CORRECTION

PATENT NO. : 4,416,065
DATED : November 22, 1983
INVENTOR(S) : Lee Hunter

It is certified that error appears in the above-identified patent and that said Letters Patent is hereby corrected as shown below:

Column 9, Claim 5, line 17, "alternatively" should be "alternately".

Signed and Sealed this

Seventh Day of February 1984

[SEAL]

Attest:

GERALD J. MOSSINGHOFF

Attesting Officer

Commissioner of Patents and Trademarks